United States Patent [19]

Itabashi

[11] Patent Number: 5,062,679
[45] Date of Patent: Nov. 5, 1991

[54] Fθ LENS SYSTEM IN OPTICAL SCANNER

[75] Inventor: Akihisa Itabashi, Mitaka, Japan

[73] Assignee: Ricoh Company, Ltd., Tokyo, Japan

[21] Appl. No.: 461,020

[22] Filed: Jan. 4, 1990

[30] Foreign Application Priority Data

Jan. 13, 1989 [JP] Japan ................................. 1-6473

[51] Int. Cl.⁵ .......................... G02B 26/08; G02B 3/04
[52] U.S. Cl. ..................................... 359/206; 359/217;
359/218; 359/710; 359/711; 359/662
[58] Field of Search ................................. 350/6.5–6.8,
350/6.1, 432, 433–434, 6.9, 6.91; 250/234–236

[56] References Cited

U.S. PATENT DOCUMENTS

| | | | |
|---|---|---|---|
| 4,836,630 | 6/1989 | Takanashi | 350/6.1 |
| 4,846,539 | 7/1989 | Takahashi | 350/6.8 |
| 4,919,502 | 4/1990 | Yamakawa | 350/6.8 |

FOREIGN PATENT DOCUMENTS 59-147316  8/1984  Japan .
61-120112  6/1986  Japan .

Primary Examiner—Rodney B. Bovernick
Assistant Examiner—James Phan
Attorney, Agent, or Firm—Oblon, Spivak, McClelland, Maier & Neustadt

[57] ABSTRACT

In an optical scanner, a light beam from a light source is formed as a line image extending in a main scanning corresponding direction and is deflected at an equal angular velocity by a rotary polygon mirror having a reflecting face in the vicinity of an image forming position of the line image and is then formed by an image forming lens system in the shape of a spot on a scanned face to optically scan the scanned face. An fθ lens system focuses and forms the light beam deflected by the rotary polygon mirror as an image on the scanned face. The fθ lens system comprises a functional device having a function for connecting a reflecting position of the rotary polygon mirror and the scanned face in an approximately conjugate relation with respect to a secondary scanning direction and an fθ function with respect to a main scanning direction; and two groups of first and second lenses are sequentially arranged from the side of the rotary polygon mirror toward the scanned face side. The lenses have first to fourth lens faces providedr from the side of the rotary polygon mirror and have shapes on a deflecting plane sequentially composed cf an arc, a straight line, a straight line and an arc from the first to fourth lens faces. The first and second lenses respectively have negative and positive refracting powers on a plane parallel to the deflecting plane.

8 Claims, 18 Drawing Sheets

Fig. 1a
MAIN
(□)
(CONCAVE)
Fig. 1b
(凸)
(CONVEX)
Fig. 1c
SECONDARY
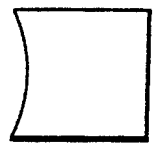
(凸)
(CONVEX)
Fig. 1d
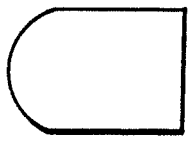
(凸)
(CONVEX)
Fig. 2
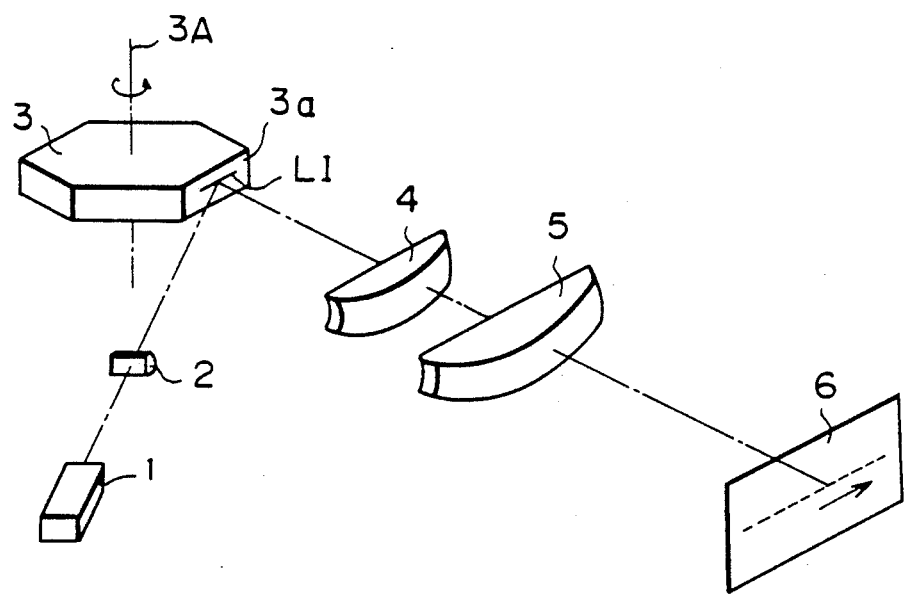

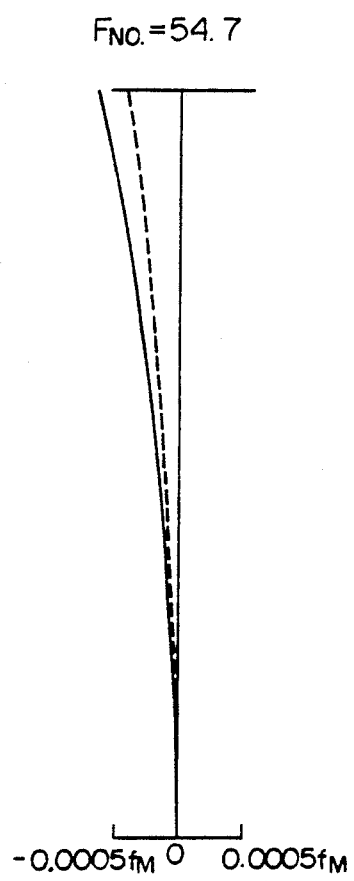
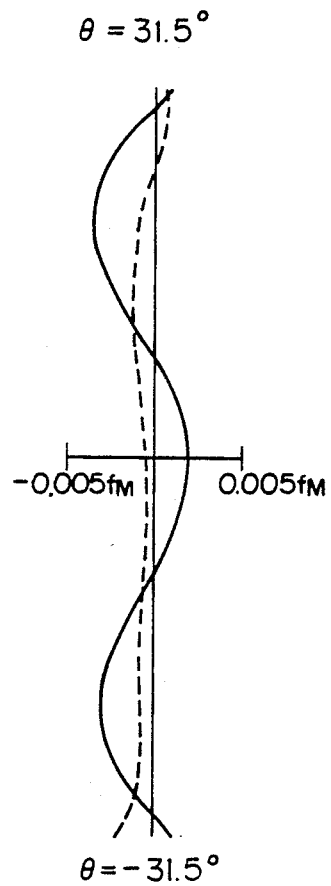
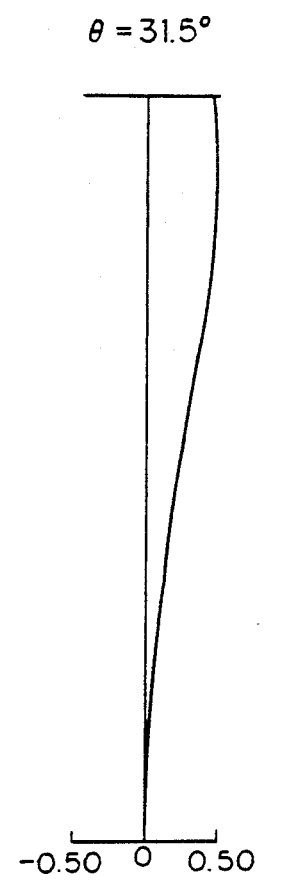
Fig.11a / Fig.11b / Fig.11c
—ABERRATION OF SPHERICAL FACE
----SINE CONDITION
FIELD CURVATURE
fθ CHARACTERISTICS $F_{NO}=54.7$ $-0.0005f_M$   0   $0.0005f_M$

—— ABERRATION OF
SPHERICAL FACE
---- SINE CONDITION $\theta = 31.5°$ $-0.005f_M$   $0.005f_M$ $\theta = -31.5°$

FIELD
CURVATURE $\theta = 31.5°$ $-0.50$   0   $0.50$ $f\theta$
CHARACTERISTICS $F_{NO.} = 54.7$ $-0.0005 f_M \quad 0 \quad 0.0005 f_M$

—— ABERRATION OF
SPHERICAL FACE
---- SINE CONDITION $\theta = 31.5°$ $-0.005 f_M \quad 0.005 f_M$ $\theta = -31.5°$

FIELD
CURVATURE $\theta = 31.5°$ $-0.50 \quad 0 \quad 0.50$ $f\theta$
CHARACTERISTICS

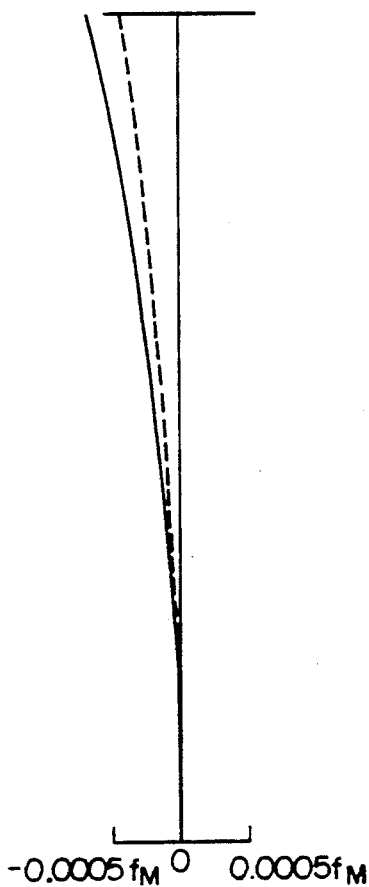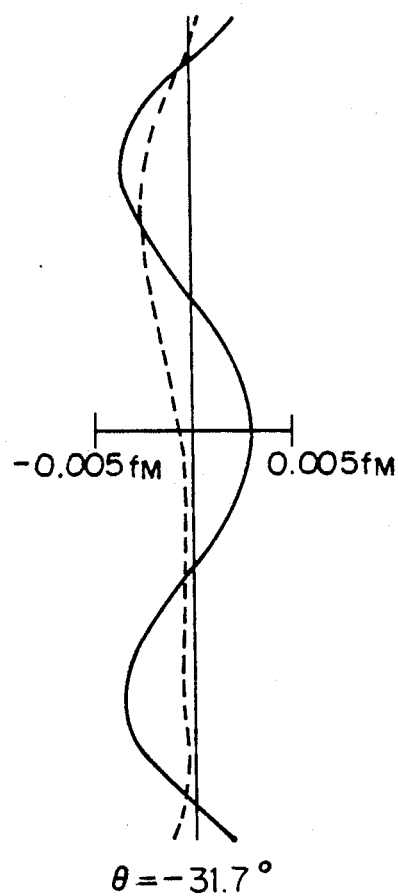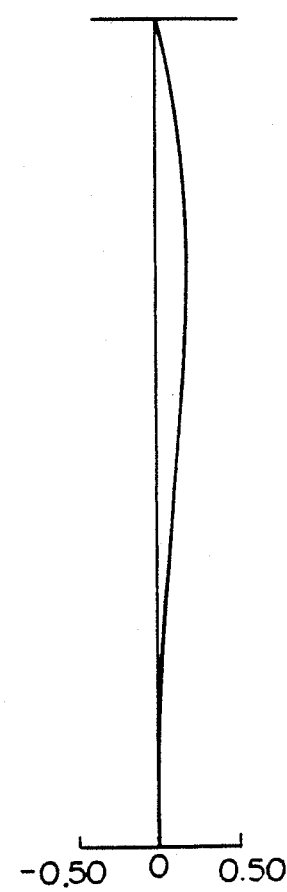
Fig. 14a — ABERRATION OF SPHERICAL FACE / ---SINE CONDITION
Fig. 14b — FIELD CURVATURE
Fig. 14c — fθ CHARACTERISTICS $F_{NO.} = 54.7$ −0.0005fM  0  0.0005fM

——ABERRATON OF
SPHERICAL FACE
----SINE CONDITION $\theta = 31.7°$

−0.005 fM  0.005fM $\theta = -31.7°$

FIELD
CURVATURE $\theta = 31.7°$

−0.50  0  0.50

$f\theta$
CHARACTERISTICS $F_{NO.} = 54.7$ $-0.0005f_M$ 0 $0.0005f_M$

—— ABERRATION OF
SPHERICAL FACE
---- SINE CONDITION $\theta = 31.7°$ $-0.005f_M$ $0.005f_M$ $\theta = -31.7°$

FIELD
CURVATURE $\theta = 31.7°$ $-0.50$ 0 $0.50$ $f\theta$
CHARACTERISTICS

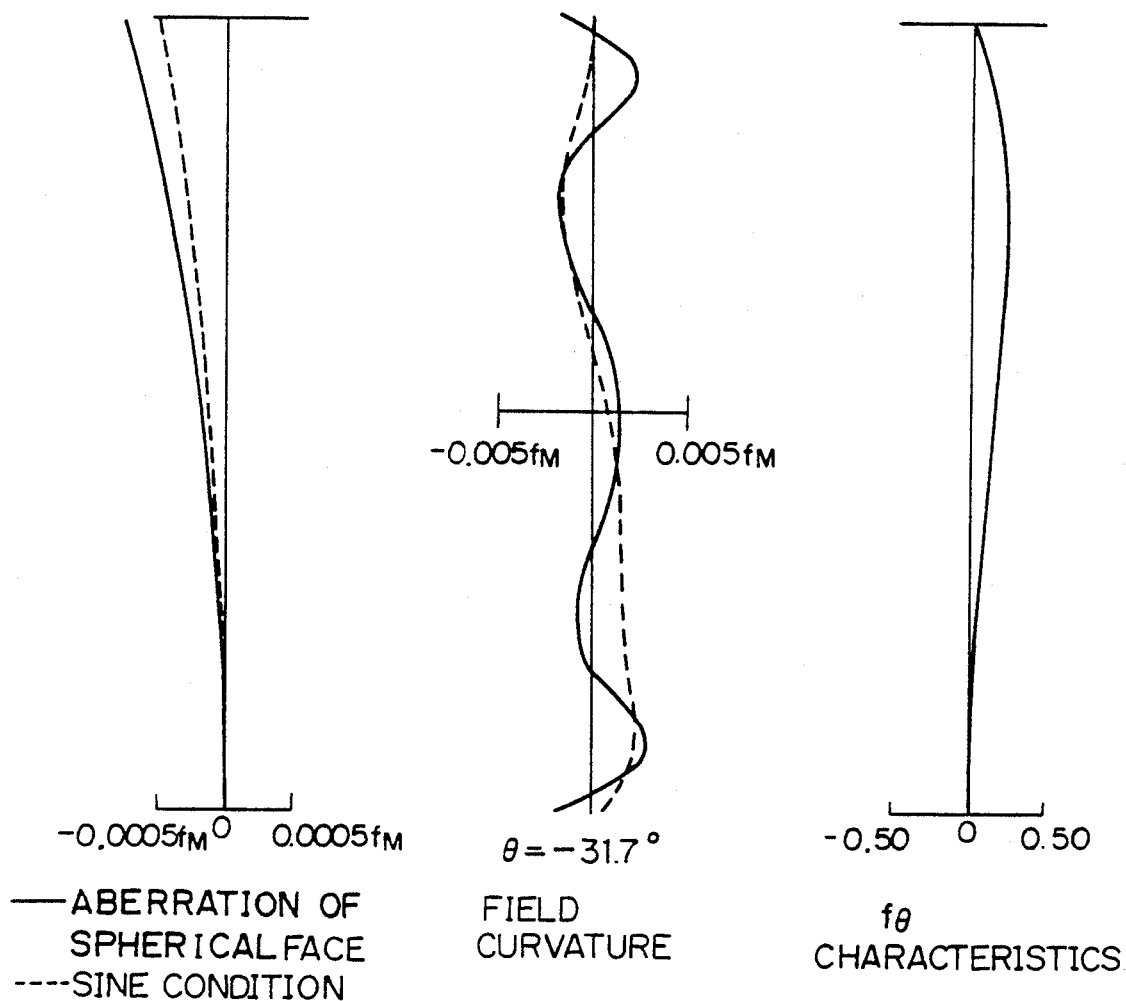

$F_{NO.} = 54.7$ $-0.0005f_M$ 0 $0.0005f_M$

— ABERRATION OF
SPHER CAL FACE
--- SINE CONDITION $\theta = 31.7°$ $-0.005f_M$  $0.005f_M$ $\theta = -31.7°$

FIELD
CURVATURE $\theta = 31.7°$ $-0.50$  0  $0.50$ $f\theta$
CHARACTERISTICS

Fig.19a
$F_{NO.} = 54.7$
Fig.19b
$\theta = 31.7°$
Fig.19c
$\theta = 31.7°$
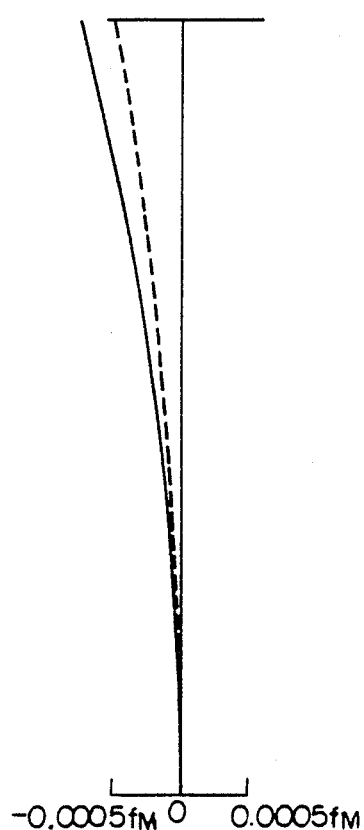
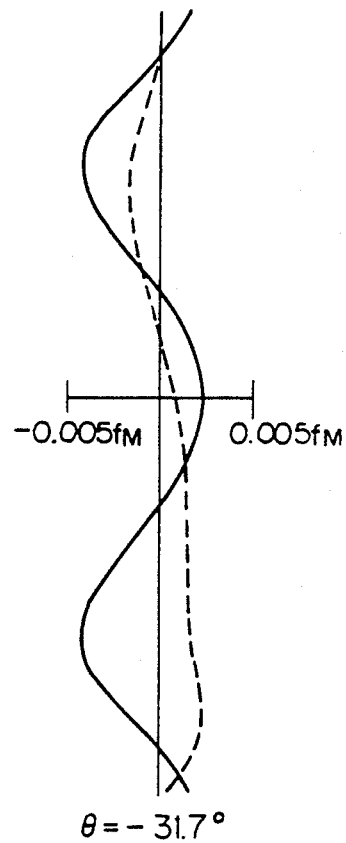
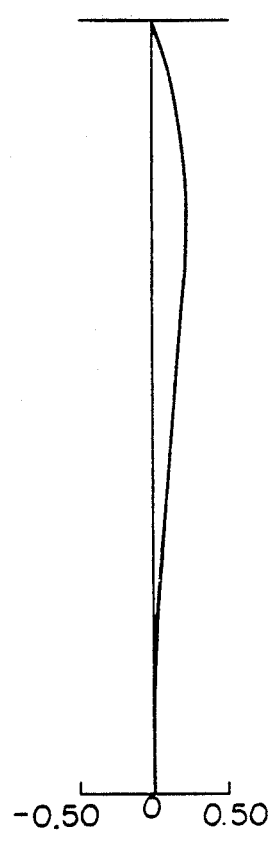
—ABERRATION OF SPHERICAL FACE
----SINE CONDITION
FIELD CURVATURE
$f\theta$ CHARACTERISTICS $F_{NO.} = 54.7$ $-0.0005f_M$  0  $0.0005f_M$

—ABERRATION OF SPHERICAL FACE
----SINE CONDITION $\theta = 31.4°$ $-0.005f_M$   $0.005f_M$ $\theta = -31.4°$

FIELD CURVATURE $\theta = 31.4°$ $-0.50$  0  $0.50$ $f\theta$ CHARACTERISTICS $F_{NO} = 54.7$ $-0.0005f_M$  $0$  $0.0005f_M$

— ABERRATION OF SPHERICAL FACE
---- SINE CONDITION $\theta = 31.4°$ $-0.0005f_M$  $0.0005f_M$ $\theta = -31.4°$

FIELD CURVATURE $\theta = 31.4°$ $-0.50$  $0$  $0.50$ $f\theta$ CHARACTERISTICS

F$_{NO.}$ = 54.7

−0.0005f$_M$  0  0.0005f$_M$

— ABERRATION OF SPHERICAL FACE
---- SINE CONDITION

θ = 31.4°

−0.005f$_M$  0.005f$_M$

θ = 31.4°

FIELD CURVATURE

θ = 31.4°

−0.50  0  0.50 fθ CHARACTERISTICS

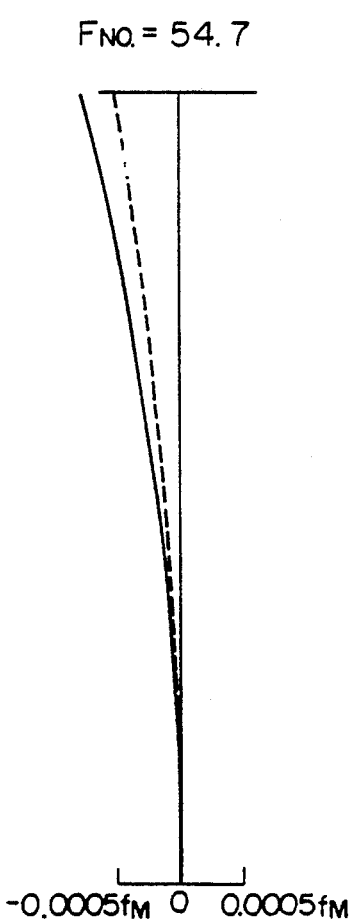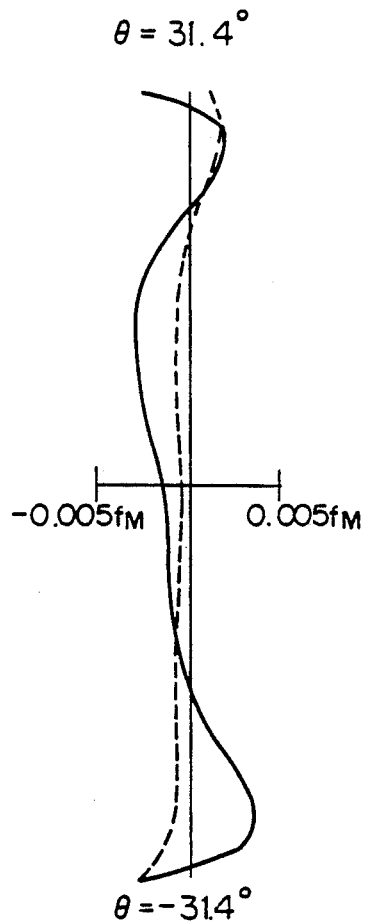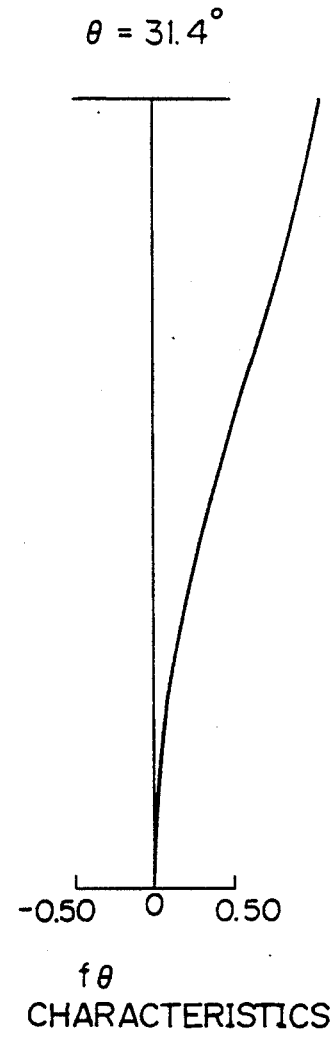
Fig. 23a — ABERRATION OF SPHERICAL FACE / ---- SINE CONDITION
Fig. 23b — FIELD CURVATURE
Fig. 23c — fθ CHARACTERISTICS

Fθ LENS SYSTEM IN OPTICAL SCANNER

BACKGROUND OF THE INVENTION

1. Field of the Invention

The present invention relates to an fθ lens system in an optical scanner using a rotary polygon mirror.

2. Description of the Related Art

An optical scanner is known as a device for writing and reading information by scanning a light beam and is used in a laser printer, a facsimile, etc. In such an optical scanner, there is a device having an optically scanning system in which a light beam from a light source is focused and formed as a line image extending in a main scanning corresponding direction and this light beam is deflected at an equal angular velocity by a rotary polygon mirror having a reflecting face in the vicinity of an image forming position of the line image. In this system, the deflected light beam is further focused and formed on a scanned face in the shape of a spot by an image forming lens system to optically scan the scanned face.

In the optical scanner using the rotary polygon mirror, there is a problem about the inclination of a reflecting face. Further, since the deflected light beam has a constant angular velocity, it is necessary to take measures for performing the scanning operation of the scanned face at a constant speed. An fθ lens system is a lens system for optically realizing the scanning operation of the scanned face at the constant speed. This lens system has an fθ function in which the height of an image formed by the incident light beam becomes fθ when the incident angle is θ and the focal distance of the lens is f.

As a method for solving the problem of the reflecting face inclination, there is a known method in which a lens system disposed between the rotary polygon mirror and the scanned face is set to an anamorphic optical system, and a reflecting position of the rotary polygon mirror and the scanned face are connected to each other in a conjugate relation with respect to a secondary scanning direction.

Japanese Patent Application Laying Open (KOKAI) No. 63-19617 discloses an fθ lens system set as the anamorphic optical system and using two lenses to solve the problems about the scanning operation at a constant speed and the inclination of the reflecting face. However, in this fθ lens system, it is not necessarily sufficient to correct a curvature of a field. Further, the diameter of an image forming spot on the scanned face is greatly varied depending on the scanning position so that it is difficult to realize the optically scanning operation of high density.

Japanese Patent Application Laying Open (KOKAI) No. 61-120112 discloses an fθ lens system using a so-called saddle-type toric face and constructed by two lenses to preferably correct the field curvature. However, in this fθ lens system, three lenses are used and thereby the cost of the system is expensive. Further, it is difficult to make the optical scanner compact.

SUMMARY OF THE INVENTION

It is therefore an object of the present invention to provide a novel fθ lens system in an optical scanner for sufficiently correcting the curvature of a field in the main and secondary scanning directions and solving the problems about the inclination of a reflecting face in the rotary polygon mirror.

The above object of the present invention can be achieved by an fθ lens system in an optical scanner in which a light beam from a light source is formed as a line image extending in a main scanning corresponding direction and is deflected at an equal angular velocity by a rotary polygon mirror having a reflecting face in the vicinity of an image forming position of the line image. The light beam is then formed by an image forming lens system in the shape of a spot on a scanned face to optically scan the scanned face, the fθ lens system focusing and forming the light beam deflected by the rotary polygon mirror as an image on the scanned face. The fθ lens system comprising functional means having a function for connecting a reflecting position of the rotary polygon mirror and the scanned face in an approximately conjugate relation with respect to a secondary scanning direction, the functional means having an fθ function with respect to a main scanning direction; and two groups of first and second lenses sequentially arranged from the side of the rotary polygon mirror toward the scanned face side; the lenses having first to fourth lens faces provided from the side of the rotary polygon mirror and having shapes on a deflecting plane sequentially composed of an arc, a straight line, a straight line and an arc from the first to fourth lens face. The first and second lenses respectively having negative and positive refracting powers on a plane parallel to the deflecting plane; the first to fourth lens faces are respectively constructed by a saddle type toric face having a radius of curvature on the deflecting perpendicular plane increased as this face is separated from an optical axis, a planar face, a concave cylindrical face having a refracting power on only the deflecting perpendicular plane, and a convex toric face having a large curvature on the deflecting perpendicular plane.

Further objects and advantages of the present invention will be apparent from the following description of the preferred embodiments of the present invention as illustrated in the accompanying drawings.

BRIEF DESCRIPTION OF THE DRAWINGS

FIG. 1a–1d are views for explaining lens shapes of an fθ lens system in the present invention;

FIGS. 2 to 8 are views for explaining an optical scanner;

FIGS. 11a to 23c are aberration diagrams, diagrams showing curvatures of fields and graphs of fθ characteristics described with respect to respective embodiments of the present invention.

DESCRIPTION OF THE PREFERRED EMBODIMENTS

Figure 3:
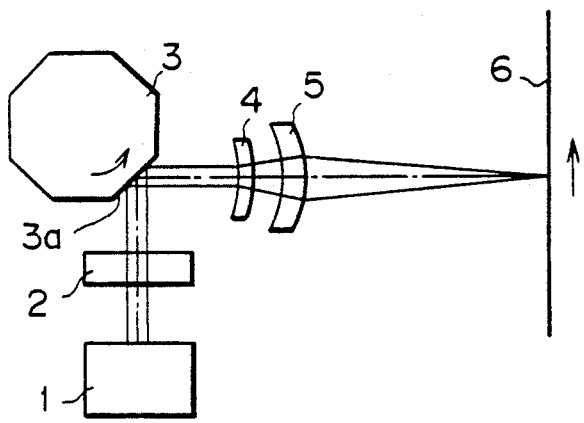

The preferred embodiments of an fθ lens system in an optical scanner of the present invention will now be described in detail with reference to the accompanying drawings.

With respect to the fθ lens system of the present invention, in an optical scanner, a light beam from a light source is focused and formed as a line image extending in a main scanning corresponding direction and this light beam is deflected at an equal angular velocity by a rotary polygon mirror having a reflecting face in the vicinity of an image forming position of the line image. This deflected light beam is focused and formed in the shape of a spot on a scanned face by an image forming lens system to optically scan the scanned face.

The above fθ lens system is a lens system for focusing and forming the light beam deflected by the rotary polygon mirror as an image on the scanned face in the optical scanner. The above fθ lens system has a function for connecting a reflecting position of the rotary polygon mirror and the scanned face in a conjugate relation with respect to a secondary scanning direction, and an fθ function in the main scanning direction.

This fθ lens system is constructed by two groups of first and second lenses sequentially arranged from the side of the rotary polygon mirror toward the scanned face side. Further, in this fθ lens system, when the respective lens faces are set from first to fourth faces arranged from the side of the above rotary polygon mirror, these lens faces on a deflecting plane sequentially have the shapes of an arc, a straight line, a straight line and an arc from the first face toward the fourth face. The first and second lenses respectively have negative and positive refracting powers on a plane parallel to the deflecting plane.

The first lens face is constructed by a saddle type toric face having a radius of curvature on the deflecting perpendicular plane increased as this face is separated from the optical axis. The second lens face is constructed by a planar face. The third lens face is constructed by a concave cylindrical face having a refracting power on only the deflecting perpendicular plane. The fourth lens face is constructed by a convex toric face having a large curvature on the deflecting perpendicular plane.

When a combined focal distance on the deflecting perpendicular plane is set to $f_s$ and the radii of curvature of the above first, third and fourth faces on the deflecting perpendicular plane are respectively set to $r'_1$, $r'_3$ and $r'_4$, the following condition with respect to these values is satisfied.

$$2.20 < \{(1/r'_1) + (1/r'_3) - (1/r'_4)\} \cdot f_s < 3.51 \quad (I)$$

The respective lens faces of the fθ lens system in the present invention will next be described with reference to FIGS. 1a–1d. In FIGS. 1a–1d, the left-hand side is the side of the rotary polygon mirror and the right-hand side is the side of the scanned face. Accordingly, with respect to the lenses, the first lens is located on the left-hand side and the second lens is located on the right-hand side. The first to fourth lens faces are sequentially represented from the left toward the right. FIGS. 1a and 1b show lens shapes of the fθ lens system on the deflecting plane and FIGS. 1c and 1d show lens shapes on the deflecting perpendicular plane.

Here, "the deflecting plane" is a plane formed by moving the light beam on an optical axis ideally deflected by the rotary polygon mirror. "The deflecting perpendicular plane" is a plane passing through an optical axis of the fθ lens system which is perpendicular to the above deflecting plane. The deflecting plane corresponds to an ideal main scanning direction with respect to an intersection line thereof crossing the scanned face. Therefore, FIGS. 1a and 1b are shown as "main". Similarly, the deflecting perpendicular plane corresponds to the secondary scanning direction and therefore FIGS. 1c and 1d are shown as "secondary".

As shown in FIGS. 1a and 1b, the first to fourth lens face shapes on the deflecting plane are sequentially constructed by an arc, a straight line, a straight line and an arc. The refracting power on the plane parallel to the deflecting plane is negative with respect to the first lens and is positive with respect to the second lens.

FIGS. 1a–1d also show whether the lens function on the above deflecting plane and the deflecting perpendicular plane is convex or concave.

The above-mentioned condition (I) will next be described in detail.

It is possible to preferably correct the field curvature in the main and secondary scanning directions by the construction of the above-mentioned lens faces in the fθ lens system.

However, it is necessary to further satisfy the above condition (I) so as to correct the field curvature in the secondary scanning direction.

Namely, in the case in which the reflecting face inclination is corrected by the above-mentioned lens face construction, when a value in the following condition, $$2.20 < \{(1/r'_1) + (1/r'_3) - (1/r'_4)\} \cdot f_s < 3.51 \quad (I)$$

exceeds a lower limit, the image forming position in the secondary scanning direction is excessively shifted from the scanned face toward the rotary polygon. When this value exceeds an upper limit, the image forming position in the secondary scanning direction is excessively shifted from the scanned face in the direction opposite to the rotary polygon. Accordingly, in a case in which the condition (I) is not satisfied, the field curvature in the secondary scanning direction becomes excessively large.

FIG. 2 schematically shows one example of an optical scanner using the fθ lens system. FIG. 3 shows a state of an optical arrangement of FIG. 2 seen from the secondary scanning direction, i.e., the situation of the optical arrangement on the deflecting plane.

In FIG. 2, a parallel light beam is emitted from a light source device 1 composed of a light source or the light source and a condenser, and is focused and formed by a cylindrical lens 2 constructing a line image forming optical system as a line image LI approximately parallel to a deflecting plane in the vicinity of a reflecting face 3a of a rotary polygon mirror 3. The longitudinal direction of this line image is a main scanning corresponding direction.

The light beam reflected by the rotary polygon mirror 3 is focused and formed by the fθ lens system in the shape of a spot on the scanned face 6. The scanned face 6 is scanned at an equal speed in accordance with the rotation of the rotary polygon mirror 3 at an equal speed in an arrow direction thereof.

Figure 4:
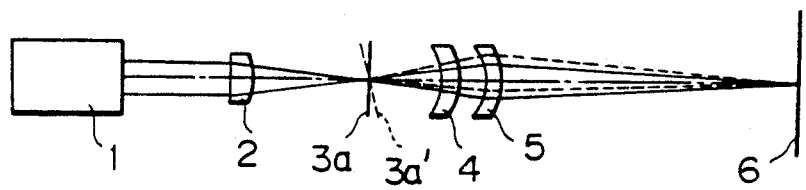

The fθ lens system is constructed by a first lens 4 and a second lens 5 respectively disposed on the sides of the rotary polygon mirror 3 and the scanned face 6. As shown in FIG. 3, on the deflecting plane, the fθ lens system having the lenses 4 and 5 connects the infinity on the light source side to the position of the scanned face 6 in a conjugate relation. In contrast to this, on the deflecting perpendicular plane, i.e., with respect to the secondary scanning direction, the fθ lens system connects a reflecting position of the rotary polygon mirror 3 to the scanned face 6 in an approximately conjugate relation. Accordingly, as shown in FIG. 4, even when the reflecting face 3a is inclined as shown by reference numeral 3a', the image forming position on the scanned face 6 provided by the fθ lens system almost does not move in the scanning direction (in the vertical direction in FIG. 4), thereby correcting the inclination of the reflecting face.

Figure 5:
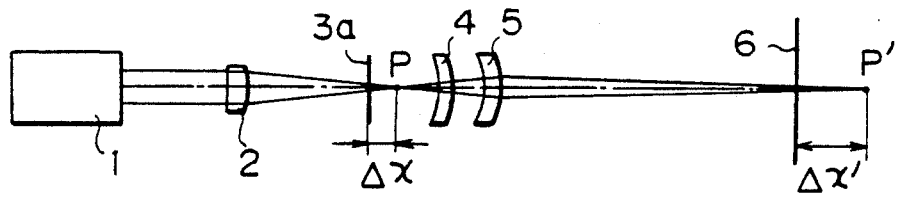

When the rotary polygon mirror 3 is rotated, the reflecting face 3a is rotated around a shaft 3A. Therefore, as shown in FIG. 5, a position shift ΔX is caused between the image forming position P of the linear image and the reflecting face 3a by the rotation of the reflecting face. Thus, a position P' of a conjugate image of the linear image provided by the fθ lens system is shifted by ΔX' from the scanned face 6.

As is well known, this shift amount ΔX' is provided by ΔX'=β²ΔX when a lateral magnification of the fθ lens system in the secondary scanning direction is β.

Figure 6:
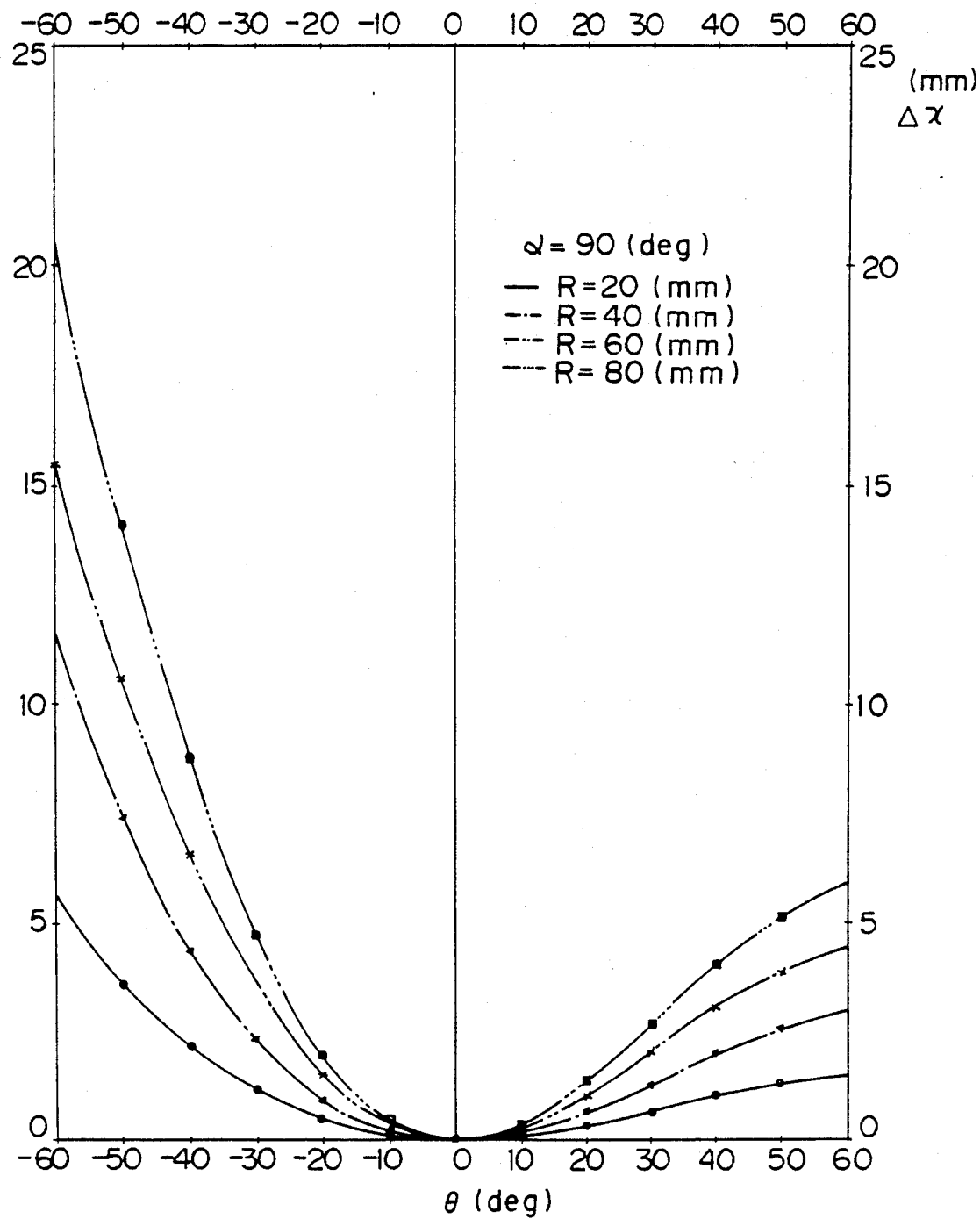
Figure 7:
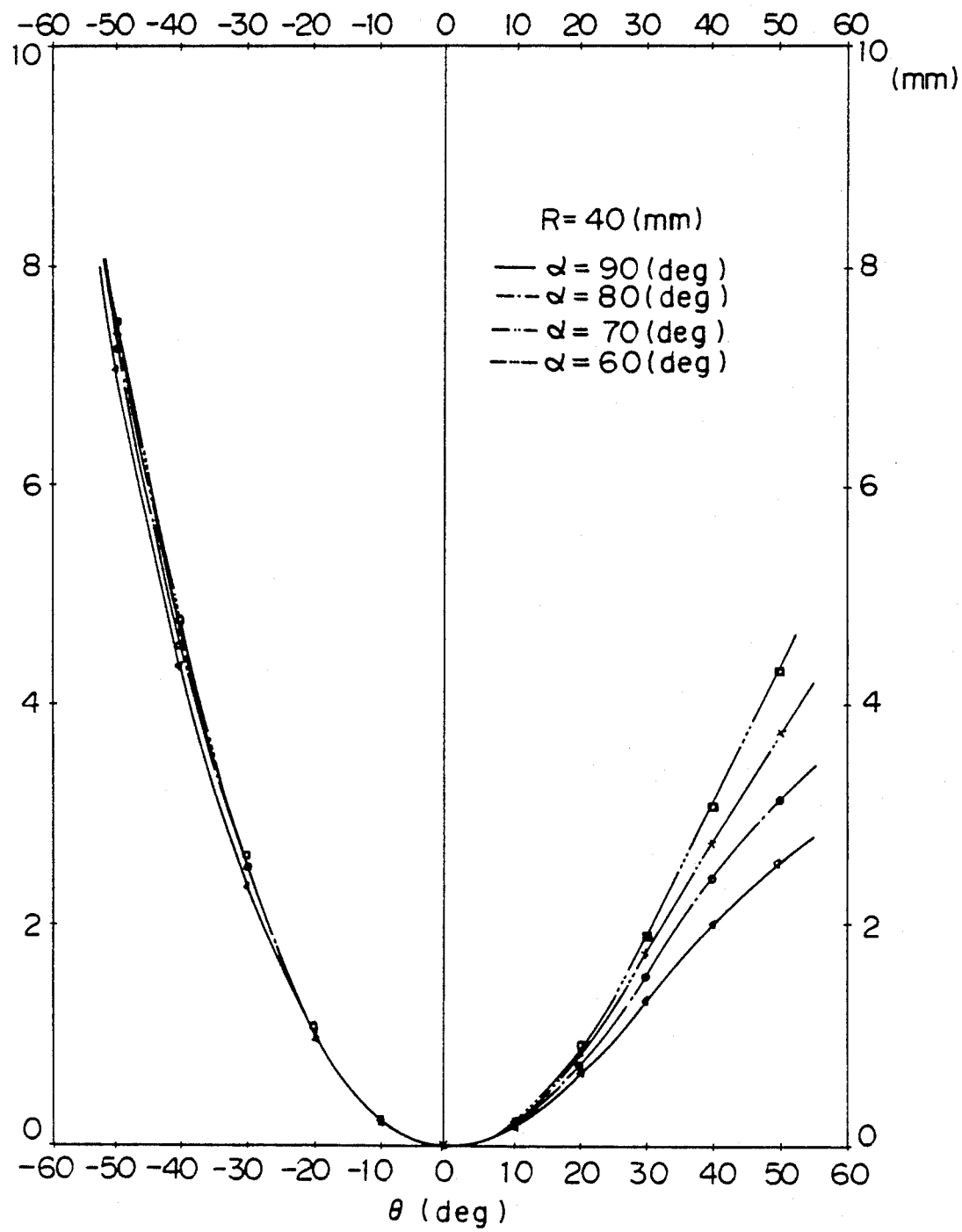

When an angle between a lens optical axis of the fθ lens system and a main deflected light beam is set to θ on the deflecting plane, the relation between the θ and the above ΔX is shown in FIGS. 6 and 7. FIG. 6 shows this relation when an intrinsic incident angle α (see FIG. 8) is 90 degrees and a radius R of an inscribed circle of the rotary polygon mirror 3 is a parameter. FIG. 7 shows the above relation when the radius R of this inscribed circle is set to 40 mm and the intrinsic incident angle α is a parameter.

As can be seen from FIGS. 6 and 7, the ΔX increases as the radius R of the inscribed circle increases and the intrinsic incident angle α decreases.

The relative shift in position between the position of the linear image and the reflecting face by the rotation of the reflecting face is caused two-dimensionally on the deflecting plane and moves asymmetrically with respect to the lens optical axis. Accordingly, in the optical scanner as shown in FIG. 2, it is necessary to preferably correct the curvature of a field in the main and secondary scanning directions of the fθ lens system. Further, the fθ characteristics must be preferably corrected with respect to the main scanning direction.

Figure 8:
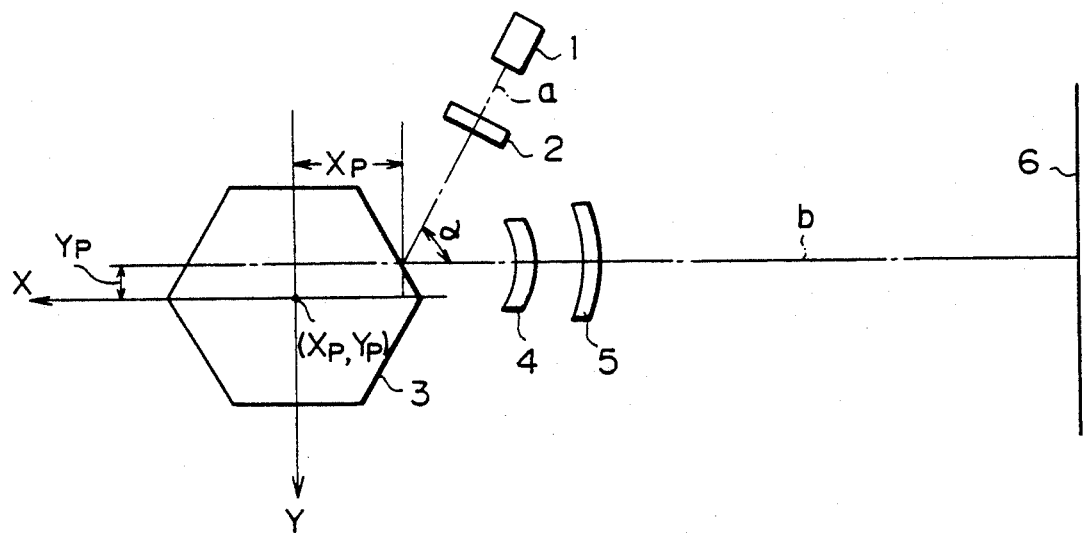

With respect to the above-mentioned intrinsic incident angle α, in FIG. 8, reference numeral a designates a main light beam incident onto the rotary polygon mirror, and reference numeral b designates a main light beam provided when the light beam reflected by the rotary polygon mirror 3 is parallel to the optical axis of the fθ lens system. The intrinsic incident angle α is defined as an intersection angle of the main light beams a and b as shown in FIG. 8.

The X and Y axes are determined as shown in FIG. 8 with the position of the rotary axis of the rotary polygon mirror 3 as an origin. The position coordinates of an intersection point of the main light beams a and b are respectively set to $X_c$ and $Y_c$.

As is well known, to reduce the change in position shift amount ΔX between the above position of the linear image and the reflecting face as much as possible, it is enough to set the following conditions with respect to the $X_c$ and the $Y_c$, $0 < X_c < R\cos(\alpha/2)$ $0 < Y_c < R\sin(\alpha/2)$.

Further, to locate the main incident light beam a outside an effective main scanning region such that a return light from the scanned face 6 is not incident again as a ghost light to a main scanning region on the scanned face, it is enough to set the following condition, $\theta < \alpha < (4\pi/N) - \theta$ with respect to the above angle α where the number of faces of the rotary polygon mirror 3 is N and the deflection angle is θ.

A saddle type toric face constituting one of the features of the present invention will next be described.

Figure 9:
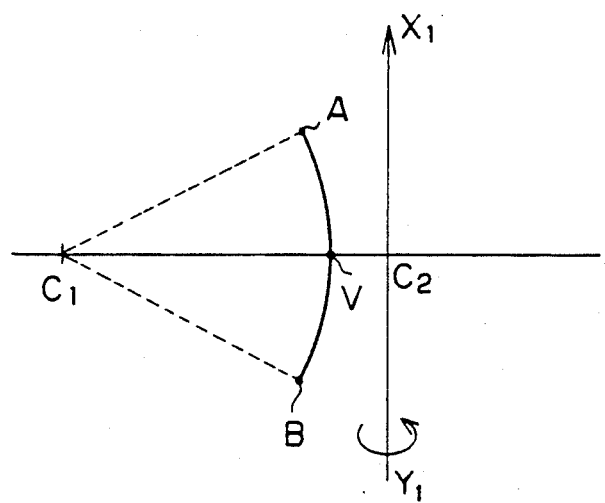
FIGS. 9 and 10 are views for explaining a saddle type toric face.
Figure 10:
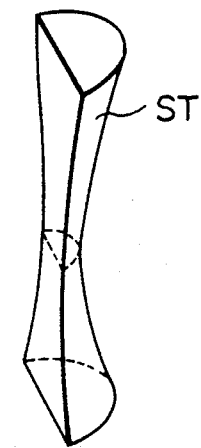

As is well known, a toric face is a face obtained by rotating an arc around a straight line which does not pass through a center of curvature of the arc on a plane including this arc. In FIG. 9, a curve passing through points A, V and B constitutes an arc around a position $C_1$ as a center of curvature. When this arc is rotated around a straight line $X_1$-$Y_1$ as an axis, a curved face ST of a saddle type is obtained as shown in FIG. 10. This curved face ST constitutes a saddle type toric face. When this saddle type toric face ST is used as a lens face, it is possible to use this lens face as a convex face and a concave face. In the present invention, the convex saddle type toric face is used as the first lens face.

The radius of curvature of the saddle type toric face on a plane perpendicular to the $X_1$-$Y_1$ axis is reduced as this toric face is axially separated from a point $C_2$. This radius of curvature is equal to the distance between the $X_1$-$Y_1$ axis and the arc AVB.

Accordingly, in the present invention, the direction of the $X_1$-$Y_1$ axis is constructed to be parallel to the main scanning direction on the deflecting plane.

The concrete embodiments 1 to 13 of the present invention will next be described in detail in the following description.

In the respective embodiments, reference numeral $f_M$ shows a combined focal distance with respect to the main scanning direction of the fθ lens system, i.e., the combined focal distance on a plane parallel to the deflecting plane. This value $f_M$ is normalized to 100. Reference numeral $f_S$ shows a combined focal distance on the deflecting perpendicular plane, i.e., the combined focal distance with respect to the secondary scanning direction. Reference numerals 2θ, α and β respectively designate a deflection angle (unit: degree), the above-mentioned intrinsic incident angle (unit: degree) and a lateral magnification on the deflecting perpendicular plane.

Reference numeral $r_{iX}$ designates a radius of curvature of an i-th lens face on the deflecting plane counted from the side of the rotary polygon mirror, i.e., the radius of curvature of lens face shapes represented in the respective upper views shown as "main" in FIG. 1. Reference numeral $r_{iY}$ designates a radius of curvature of the i-th lens face on the deflecting perpendicular plane, i.e., the radius of curvature of lens face shapes represented in the respective lower views shown as "secondary" in FIG. 1. In particular, $r_{1Y}$, $r_{3Y}$ and $r_{4Y}$ are explained as $r'_1$, $r'_3$ and $r'_4$ in the condition (I). Accordingly, with respect to the first lens face, an $r_{1X}$ designates a distance between points V and $C_1$ in FIG. 9, and the $r_{1Y}$ designates a distance between the points V and $C_2$. Reference numeral $d_i$ designates a distance between the i-th lens faces. Reference numeral $d_0$ designates a distance from the reflecting face of the rotary polygon mirror to the first lens face. Reference numeral $n_j$ designates a refractive index of a j-th lens.

Further, reference numeral $K_1$ designates $\{(1/r'_1) + (1/r'_4) - (1/r'_4)\} \cdot f_S$ in the above condition (I).

EMBODIMENT 1

| | \multicolumn{5}{c}{$f_M = 100, f_s = 16.963, \beta = -7.205, \alpha = 54, 2\theta = 63.1$} |
|---|---|---|---|---|---|
| | \multicolumn{5}{c}{$K1 = 2.592, d_0 = 7.816$} |
| i | $r_{iX}$ | $r_{iY}$ | $d_i$ | j | $n_j$ |
| 1 | −112.654 | 8.057 | 5.531 | 1 | 1.71221 |
| 2 | ∞ | ∞ | 10.943 | | |
| 3 | ∞ | −14.911 | 6.373 | 2 | 1.67500 |
| 4 | −46.055 | −10.445 | | | |

FIGS. 11a, 11b and 11c respectively show an aberration diagram, a diagram showing a field curvature and an fθ characteristic graph with respect to the embodiment 1. The field curvature is shown in relation to the rotation of the rotary polygon mirror and a broken line shows the field curvature in the main scanning direction and a solid line shows the field curvature in the secondary scanning direction.

The fθ characteristics are defined by $(h - f_M\theta)100/(f_M\theta)$ when the height of an ideal image is $f_M\theta$ and the height of the real image is h.

EMBODIMENT 2

| | \multicolumn{5}{c}{$f_M = 100, f_s = 16.468, \beta = -7.515, \alpha = 54, 2\theta = 63.1$} |
|---|---|---|---|---|---|
| | \multicolumn{5}{c}{$K1 = 2.558, d_0 = 7.816$} |
| i | $r_{iX}$ | $r_{iY}$ | $d_i$ | j | $n_j$ |
| 1 | −112.654 | 7.564 | 5.531 | 1 | 1.71221 |
| 2 | ∞ | ∞ | 10.943 | | |
| 3 | ∞ | −13.227 | 6.373 | 2 | 1.67500 |
| 4 | −46.055 | −10.127 | | | |

Figure 12A:
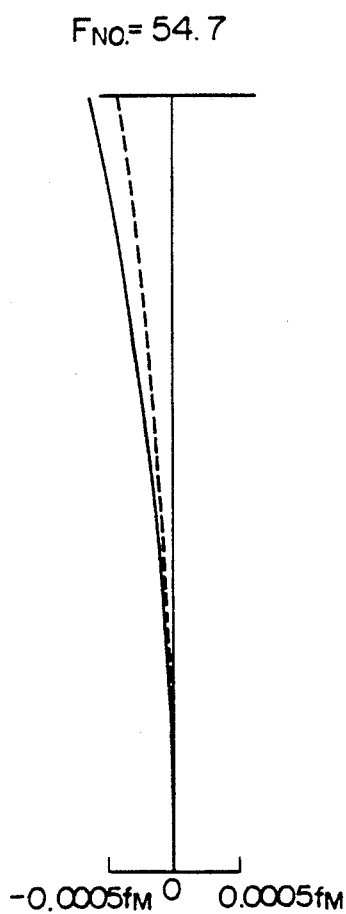
Figure 12B:
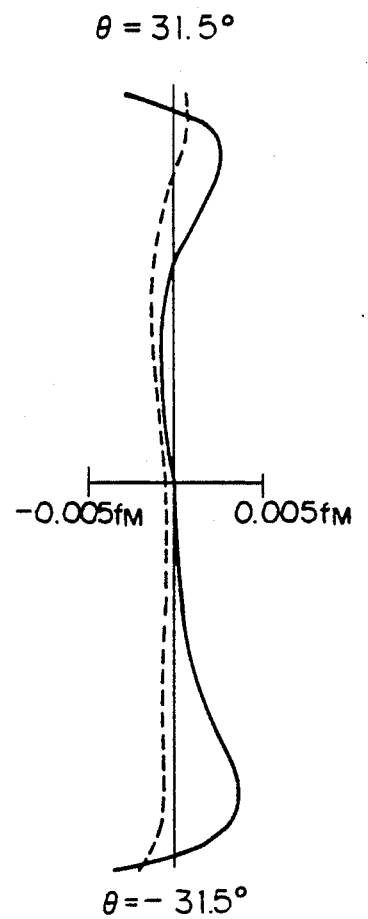
Figure 12C:
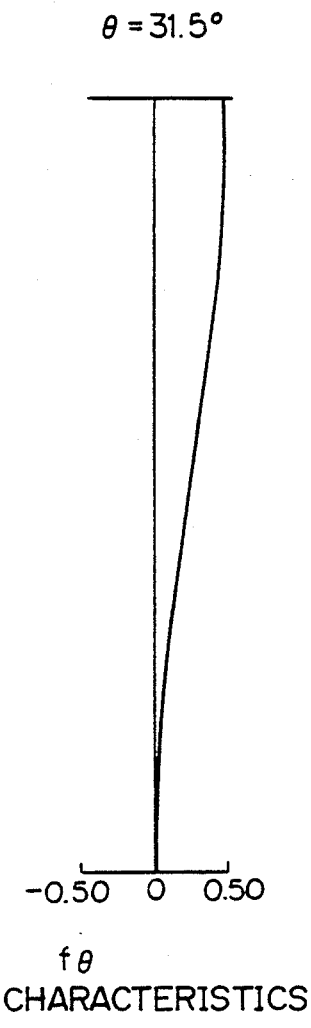

FIGS. 12a, 12b and 12c respectively show an aberration diagram, a diagram of a field curvature and an fθ characteristic graph with respect to the embodiment 2.

EMBODIMENT 3

| | \multicolumn{5}{c}{$f_M = 100, f_s = 16.754, \beta = -7.332, \alpha = 54, 2\theta = 63.1$} |
|---|---|---|---|---|---|
| | \multicolumn{5}{c}{$K1 = 2.580, d_0 = 7.816$} |
| i | $r_{iX}$ | $r_{iY}$ | $d_i$ | j | $n_j$ |
| 1 | −112.654 | 7.84 | 5.531 | 1 | 1.71221 |
| 2 | ∞ | ∞ | 10.943 | | |
| 3 | ∞ | −14.189 | 6.373 | 2 | 1.67500 |
| 4 | −46.055 | −10.317 | | | |

Figure 13A:
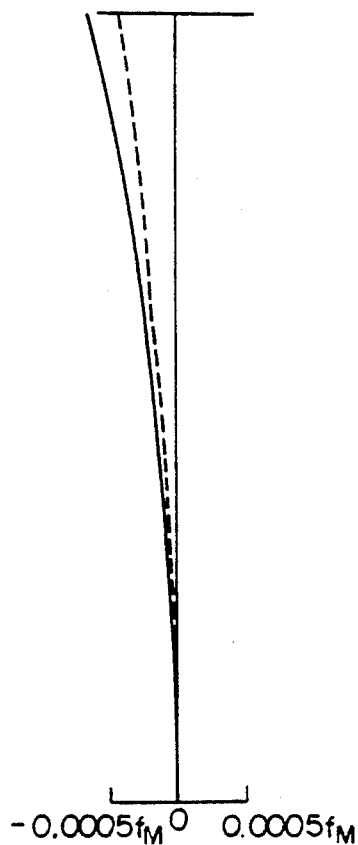
Figure 13B:
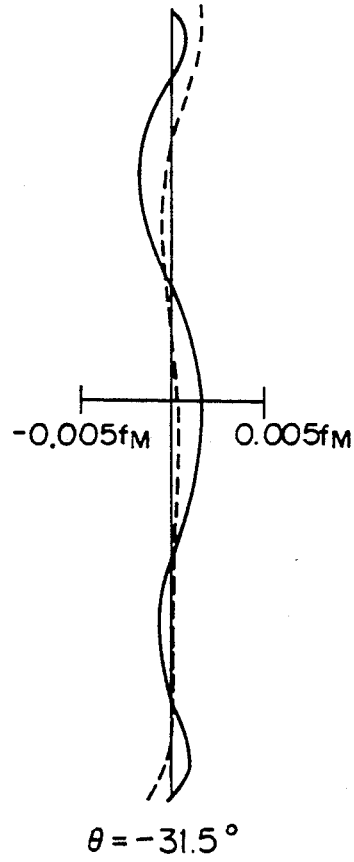
Figure 13C:
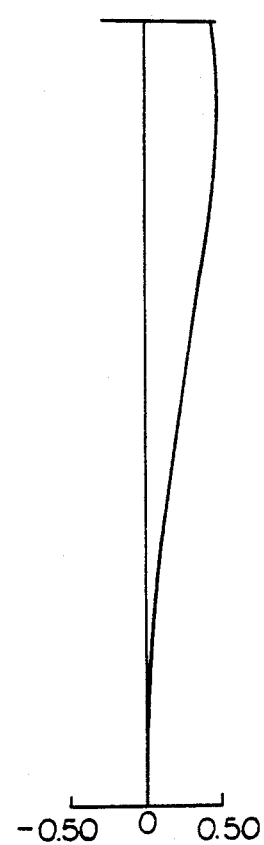

FIGS. 13a, 13b and 13c respectively show an aberration diagram, a diagram of a field curvature and an fθ characteristic graph with respect to the embodiment 3.

EMBODIMENT 4

| | \multicolumn{5}{c}{$f_M = 100, f_s = 17.142, \beta = -8.000, \alpha = 54, 2\theta = 63.4$} |
|---|---|---|---|---|---|
| | \multicolumn{5}{c}{$K1 = 3.510, d_0 = 5.411$} |
| i | $r_{iX}$ | $r_{iY}$ | $d_i$ | j | $n_j$ |
| 1 | −113.348 | 6.012 | 4.209 | 1 | 1.71221 |
| 2 | ∞ | ∞ | 13.468 | | |
| 3 | ∞ | −16.498 | 6.012 | 2 | 1.67500 |
| 4 | −46.536 | −10.098 | | | |

FIGS. 14a, 14b and 14c respectively show an aberration diagram, a diagram of a field curvature and an fθ characteristic graph with respect to the embodiment 4.

EMBODIMENT 5

| | \multicolumn{5}{c}{$f_M = 100, f_s = 16.486, \beta = -8.441, \alpha = 54, 2\theta = 63.4$} |
|---|---|---|---|---|---|
| | \multicolumn{5}{c}{$K1 = 3.486, d_0 = 5.411$} |
| i | $r_{iX}$ | $r_{iY}$ | $d_i$ | j | $n_j$ |
| 1 | −113.348 | 5.610 | 4.209 | 1 | 1.71221 |
| 2 | ∞ | ∞ | 13.468 | | |
| 3 | ∞ | −14.430 | 6.012 | 2 | 1.67500 |
| 4 | −46.536 | −9.756 | | | |

Figure 15A:
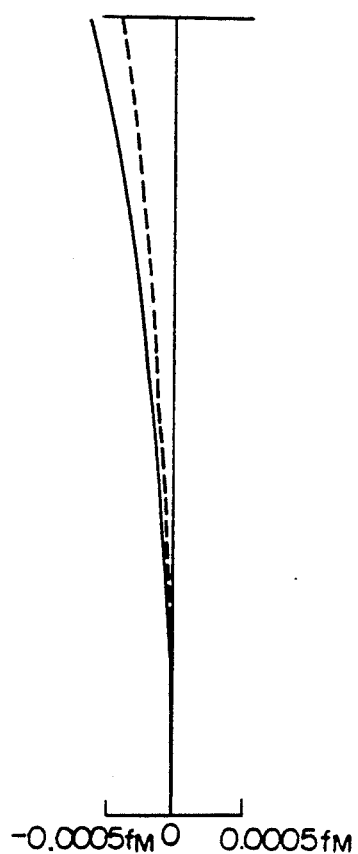
Figure 15B:
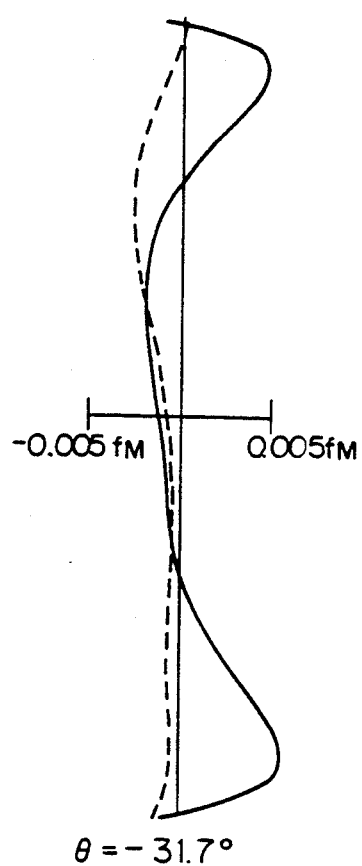
Figure 15C:
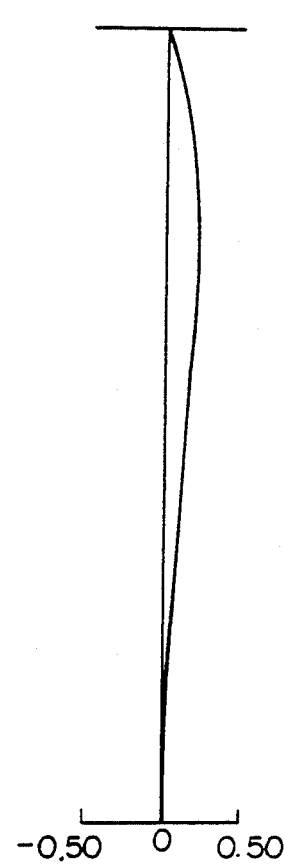

FIGS. 15a, 15b and 15c respectively show an aberration diagram, a diagram of a field curvature and an fθ characteristic graph with respect to the embodiment 5.

EMBODIMENT 6

| | \multicolumn{5}{c}{$f_M = 100, f_s = 16.783, \beta = -8.235, \alpha = 54, 2\theta = 63.4$} |
|---|---|---|---|---|---|
| | \multicolumn{5}{c}{$K1 = 3.501, d_0 = 5.411$} |
| i | $r_{iX}$ | $r_{iY}$ | $d_i$ | j | $n_j$ |
| 1 | −113.348 | 5.786 | 4.209 | 1 | 1.71221 |
| 2 | ∞ | ∞ | 13.468 | | |
| 3 | ∞ | −15.392 | 6.012 | 2 | 1.67500 |
| 4 | −46.536 | −9.927 | | | |

Figure 16A:
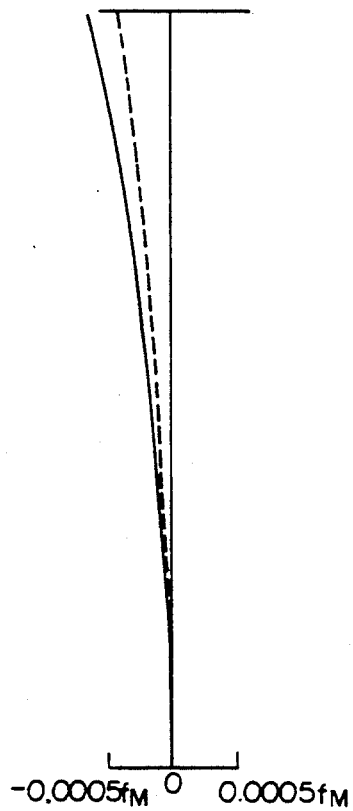
Figure 16B:
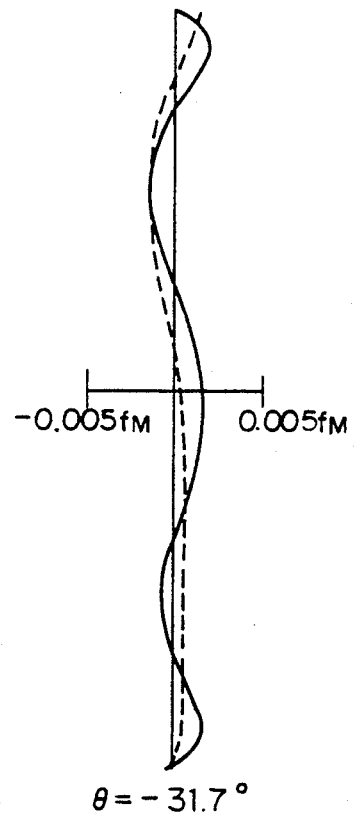
Figure 16C:
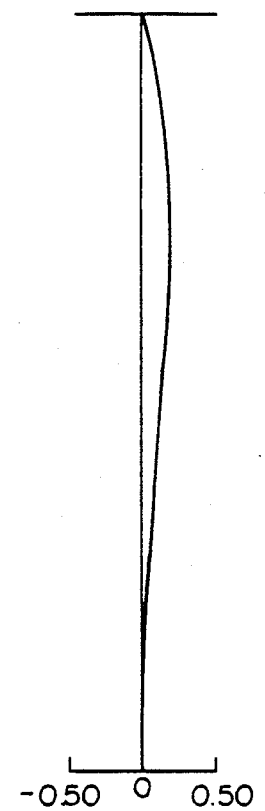

FIGS. 16a, 16b and 16c respectively show an aberration diagram, a diagram of a field curvature and an fθ characteristic graph with respect to the embodiment 6.

EMBODIMENT 7

| | \multicolumn{5}{c}{$f_M = 100, f_s = 12.371, \beta = -10.496, \alpha = 54, 2\theta = 63.4$} |
|---|---|---|---|---|---|
| | \multicolumn{5}{c}{$K1 = 2.802, d_0 = 5.411$} |
| i | $r_{iX}$ | $r_{iY}$ | $d_i$ | j | $n_j$ |
| 1 | −71.179 | 4.816 | 3.968 | 1 | 1.67500 |
| 2 | ∞ | ∞ | 9.800 | | |
| 3 | ∞ | −10.702 | 5.291 | 2 | 1.76605 |
| 4 | −44.973 | −8.906 | | | |

FIGS. 17a, 17b and 17c respectively show an aberration diagram, a diagram of a field curvature and an fθ characteristic graph with respect to the embodiment 7.

EMBODIMENT 8

| | \multicolumn{5}{c}{$f_M = 100, f_s = 12.580, \beta = -10.283, \alpha = 54, 2\theta = 63.4$} |
|---|---|---|---|---|---|
| | \multicolumn{5}{c}{$K1 = 2.823, d_0 = 5.411$} |
| i | $r_{iX}$ | $r_{iY}$ | $d_i$ | j | $n_j$ |
| 1 | −71.179 | 4.939 | 3.968 | 1 | 1.67500 |
| 2 | ∞ | ∞ | 9.800 | | |
| 3 | ∞ | −11.303 | 5.291 | 2 | 1.76605 |
| 4 | −44.973 | −9.056 | | | |

Figure 18A:
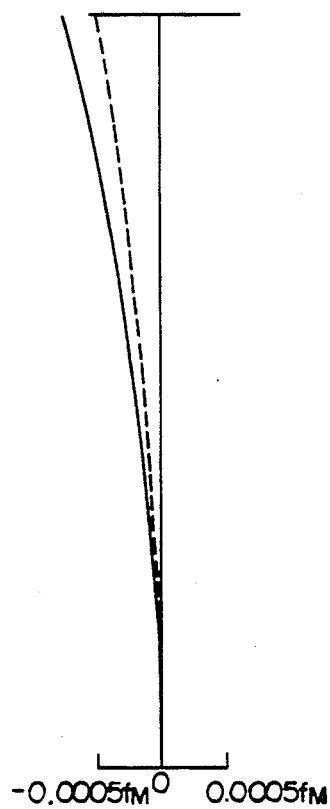
Figure 18B:
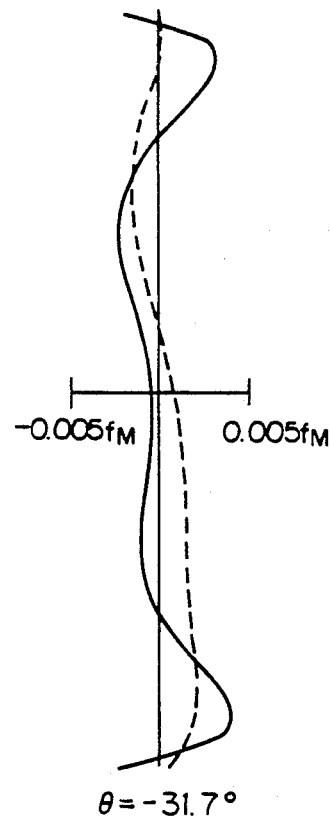
Figure 18C:
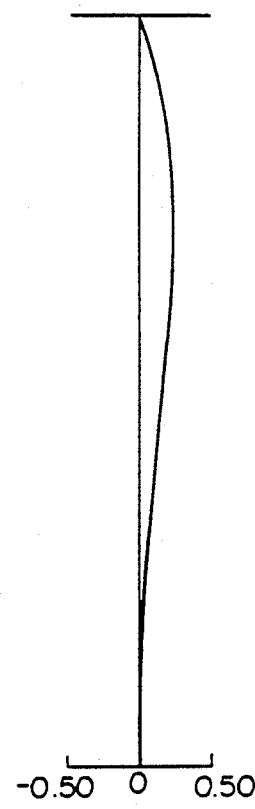

FIGS. 18a, 18b and 18c respectively show an aberration diagram, a diagram of a field curvature and an fθ characteristic graph with respect to the embodiment 8.

EMBODIMENT 9

| | \multicolumn{5}{c}{$f_M = 100, f_s = 12.299, \beta = -10.560, \alpha = 54, 2\theta = 63.4$} |
|---|---|---|---|---|---|
| | \multicolumn{5}{c}{$K1 = 2.794, d_0 = 5.411$} |
| i | $r_{iX}$ | $r_{iY}$ | $d_i$ | j | $n_j$ |
| 1 | −71.179 | 4.771 | 3.968 | 1 | 1.67500 |
| 2 | ∞ | ∞ | 9.800 | | |
| 3 | ∞ | −10.462 | 5.291 | 2 | 1.76605 |
| 4 | −44.973 | −8.838 | | | |

FIGS. 19a, 19b and 19c respectively show an aberration diagram, a diagram of a field curvature and an fθ characteristic graph with respect to the embodiment 9.

EMBODIMENT 10

$f_M = 100$, $f_s = 15.000$, $\beta = -7.698$, $\alpha = 54$, $2\theta = 62.7$
$K1 = 2.221$, $d_0 = 9.019$

| i | $r_iX$ | $r_iY$ | $d_i$ | j | $n_i$ |
|---|--------|--------|-------|---|---------|
| 1 | −114.48 | 8.297 | 3.006 | 1 | 1.71221 |
| 2 | ∞ | ∞ | 11.303 | | |
| 3 | ∞ | −12.025 | 4.449 | 2 | 1.60909 |
| 4 | −41.245 | −9.035 | | | |

Figure 20A:
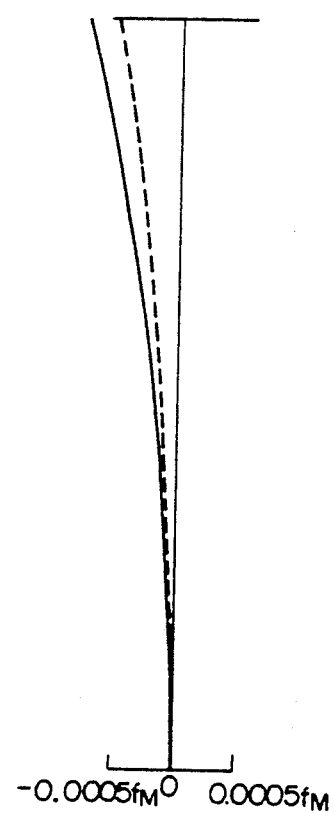
Figure 20B:
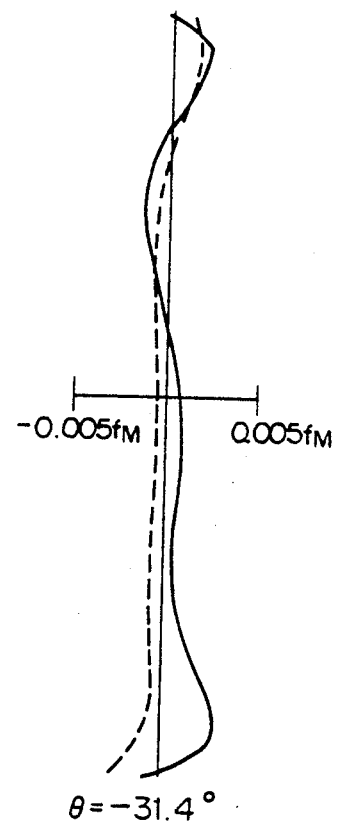
Figure 20C:
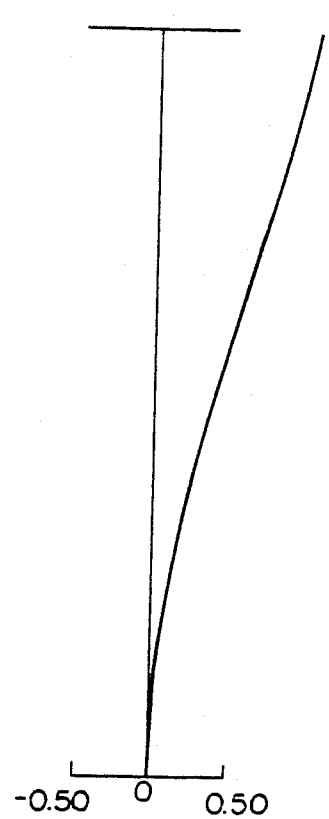

FIGS. 20a, 20b and 20c respectively show an aberration diagram, a diagram of a field curvature and an fθ characteristic graph with respect to the embodiment 10.

EMBODIMENT 11

$f_M = 100$, $f_s = 15.076$, $\beta = -7.647$, $\alpha = 54$, $2\theta = 62.7$
$K1 = 2.230$, $d_0 = 9.019$

| i | $r_iX$ | $r_iY$ | $d_i$ | j | $n_i$ |
|---|--------|--------|-------|---|---------|
| 1 | −114.48 | 8.377 | 3.006 | 1 | 1.71221 |
| 2 | ∞ | ∞ | 11.303 | | |
| 3 | ∞ | −12.265 | 4.449 | 2 | 1.60909 |
| 4 | −41.245 | −9.085 | | | |

Figure 21A:
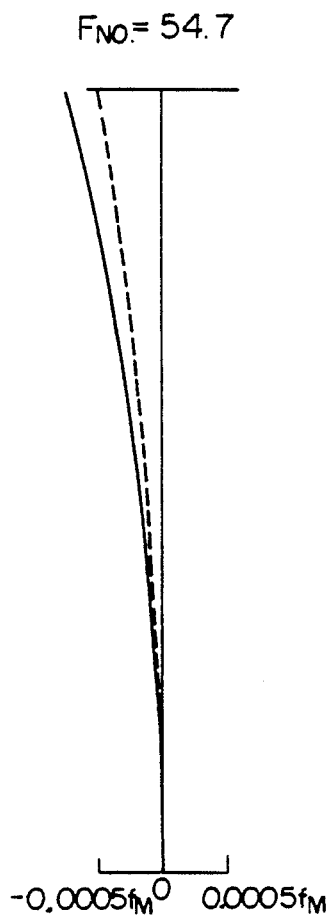
Figure 21B:
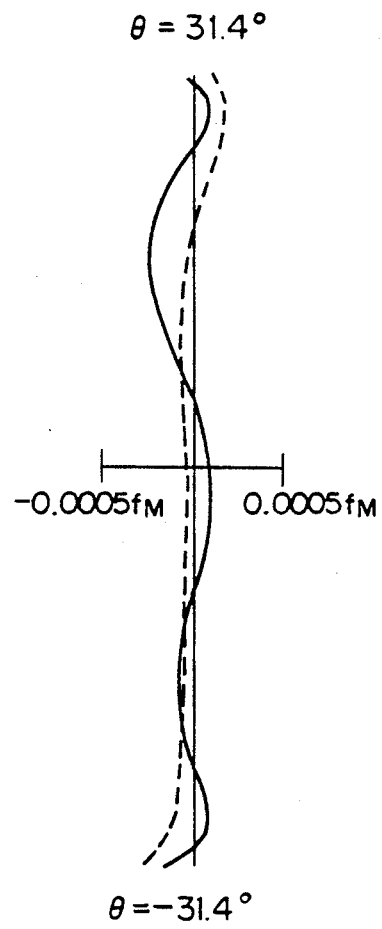
Figure 21C:
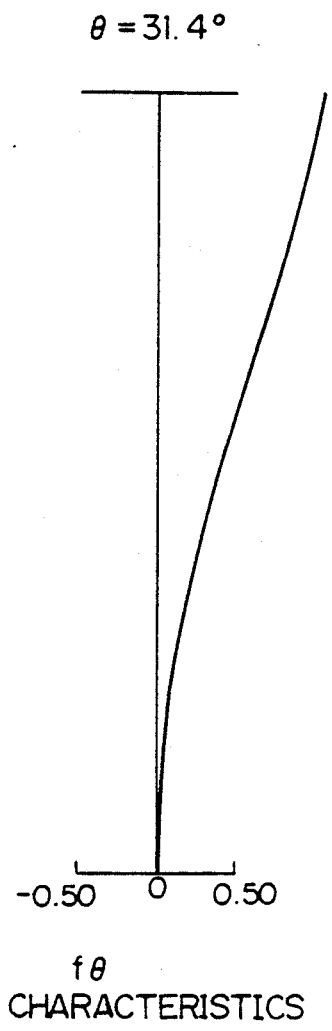

FIGS. 21a, 21b and 21c respectively show an aberration diagram, a diagram of a field curvature and an fθ characteristic graph with respect to the embodiment 11.

EMBODIMENT 12

$f_M = 100$, $f_s = 15.310$, $\beta = -7.503$, $\alpha = 54$, $2\theta = 62.7$
$K1 = 2.255$, $d_0 = 9.019$

| i | $r_iX$ | $r_iY$ | $d_i$ | j | $n_i$ |
|---|--------|--------|-------|---|---------|
| 1 | −114.48 | 8.628 | 3.006 | 1 | 1.71221 |
| 2 | ∞ | ∞ | 11.303 | | |
| 3 | ∞ | −12.987 | 4.449 | 2 | 1.60909 |
| 4 | −41.245 | −9.224 | | | |

Figure 22A:
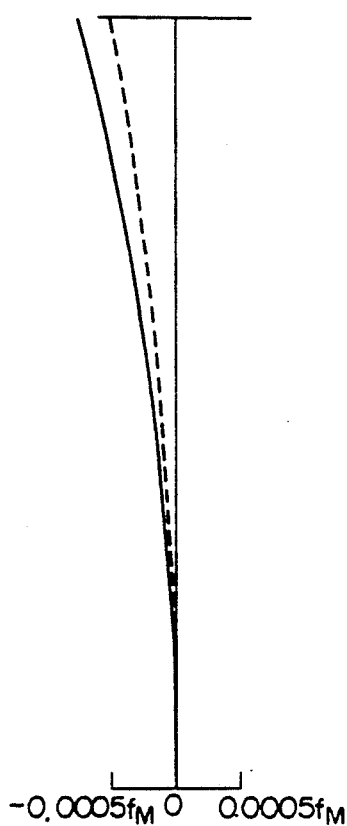
Figure 22B:
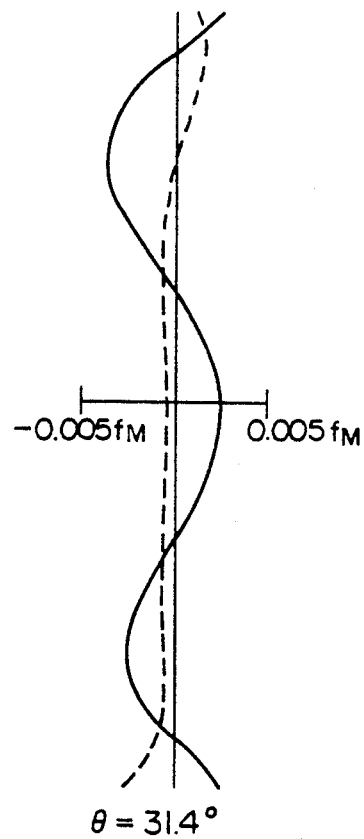
Figure 22C:
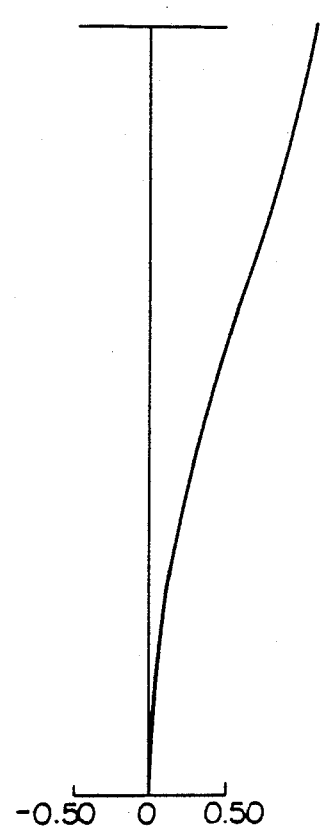

FIGS. 22a, 22b and 22c respectively show an aberration diagram, a diagram of a field curvature and an fθ characteristic graph with respect to the embodiment 12.

EMBODIMENT 13

$f_M = 100$, $f_s = 14.902$, $\beta = -7.750$, $\alpha = 54$, $2\theta = 62.7$
$K1 = 2.209$, $d_0 = 9.019$

| i | $r_iX$ | $r_iY$ | $d_i$ | j | $n_i$ |
|---|--------|--------|-------|---|---------|
| 1 | −114.48 | 8.195 | 3.006 | 1 | 1.71221 |
| 2 | ∞ | ∞ | 11.303 | | |
| 3 | ∞ | −11.712 | 4.449 | 2 | 1.60909 |
| 4 | −41.245 | −8.963 | | | |

FIGS. 23a, 23b and 23c respectively show an aberration diagram, a diagram of a field curvature and an fθ characteristic graph with respect to the embodiment 13.

In the respective embodiments of the present invention mentioned above, the aberration is preferably provided and the curvature of a field is particularly corrected very preferably in the main and secondary scanning directions. Further, the fθ characteristics are also preferable in these embodiments.

As mentioned above, the present invention can provide a novel fθ lens system in an optical scanner. Since this fθ lens system is constructed as above, it is possible to preferably correct the inclination of a reflecting face in the rotary polygon mirror and the curvature of a field in the main and secondary scanning directions, thereby performing an optically scanning operation of high density.

Many widely different embodiments of the present invention may be constructed without departing from the spirit and scope of the present invention. It should be understood that the present invention is not limited to the specific embodiments described in the specification, except as defined in the appended claims.

What is claimed is:

1. An fθ lens system in an optical scanner in which a light beam from a light source is formed as a line image extending in a main scanning corresponding direction and is deflected at an equal angular velocity by a rotary polygon mirror having a reflecting face in the vicinity of an image forming position of the line image and is then formed by an image forming lens system in the shape of a spot on a scanned face to optically scan the scanned face, said fθ lens system focusing and forming the light beam deflected by the rotary polygon mirror as an image on the scanned face, said fθ lens system having a function for connecting a reflecting position of the rotary polygon mirror and the scanned face in an approximately conjugate relation with respect to a secondary scanning direction, and having an fθ function with respect to a main scanning direction, said fθ lens system comprising two groups of first and second lenses sequentially arranged from the side of the rotary polygon mirror toward the scanned face side, said lenses having first to fourth lens faces provided from the side of said rotary polygon mirror and having shapes on a deflecting plane sequentially composed of an arc, a straight line, a straight line and an arc from the first to fourth lens faces, said first and second lenses respectively having negative and positive refracting powers on a plane parallel to the deflecting plane, said first to fourth lens faces being respectively constructed by a saddle type toric face having a radius of curvature on the deflecting perpendicular plane increased as this face is separated from an optical axis, a planar face, a concave cylindrical face having a refracting power on only the deflecting perpendicular plane, and a convex toric face having a large curvature on the deflecting perpendicular plane, a combined focal distance fs on the deflecting perpendicular plane, radii of curvature $r_1'$, $r_3'$ and $r_4'$ corresponding respectively to said first, third and fourth lens faces on the deflecting perpendicular plane satisfying the following condition, $$2.20 < \{(1/r_1') + (1/r_3') - (1/r_4')\} \cdot fs < 3.51.$$

2. An fθ lens system according to claim 1, wherein the direction of a rotary axis for forming the saddle type toric face is parallel to a main scanning direction on the deflecting plane.

3. An fθ lens system according to claim 1, wherein a lateral magnification $\beta$ of said fθ lens system in a secondary scanning direction satisfies the following condition, $$|\beta| > 1.$$

4. An fθ lens system according to claim 2, wherein a lateral magnification $\beta$ of said fθ lens system in a secondary scanning direction satisfies the following condition, $$|\beta| > 1.$$

5. An optical scanner comprising:
a light source for generating a light beam;
a rotary polygon mirror having a reflecting face on which said light beam impinges to form a line image extending in a main scanning corresponding direction, said polygon mirror thereby generating a reflected light beam at an image forming position of the line image;
an image forming fθ lens system for forming said reflected light beam in the shape of a spot on a scanned face to optically scan the scanned face, said fθ lens system focusing and forming the light beam deflected by the rotary polygon mirror as an image on the scanned face, said fθ lens system having a function for connecting a reflecting position of the rotary polygon mirror and the scanned face in an approximately conjugate relation with respect to a secondary scanning direction, and having an fθ function with respect to a main scanning direction, said fθ lens system comprising two groups of first and second lenses sequentially arranged from the side of the rotary polygon mirror toward the scanned face side;
said first and second lenses comprising first to fourth lens faces provided from the side of said rotary polygon mirror and having shapes on a deflecting plane sequentially composed of an arc, a straight line, a straight line and an arc from the first to fourth lens faces, respectively, said first and second lenses respectively having negative and positive refracting powers on a plane parallel to the deflecting plane;
said first to fourth lens faces being respectively constructed by a saddle type toric face having a radius of curvature on the deflecting perpendicular plane increased as this face is separated from an optical axis, a planar face, a concave cylindrical face having a refracting power on only the deflecting perpendicular plane, and a convex toric face having a large curvature on the deflecting perpendicular plane;
a combined focal distance fs on the deflecting perpendicular plane, radii of curvature $r_1'$, $r_3'$ and $r_4'$ corresponding respectively to said first, third and fourth lens faces on the deflecting perpendicular plane satisfying the following condition, $$2.20 < \{(1/r_1') + (1/r_3') - (1/r_4')\} \cdot fs < 3.51.$$

6. An fθ lens system according to claim 5, wherein the direction of a rotary axis for forming the saddle type toric face is parallel to a main scanning direction on the deflecting plane.

7. An fθ lens system according to claim 5, wherein a lateral magnification $\beta$ of said fθ lens system in a secondary scanning direction satisfies the following condition, $$|\beta| > 1.$$

8. An fθ lens system according to claim 6, wherein a lateral magnification $\beta$ of said fθ lens system in a secondary scanning direction satisfies the following condition, $$|\beta| > 1.$$

* * * * *